(12) United States Patent
Abe et al.

(10) Patent No.: US 7,625,262 B2
(45) Date of Patent: Dec. 1, 2009

(54) MATERIAL FOR PURIFICATION OF SEMICONDUCTOR POLISHING SLURRY, MODULE FOR PURIFICATION OF SEMICONDUCTOR POLISHING SLURRY AND PROCESS FOR PRODUCING SEMICONDUCTOR POLISHING SLURRY

(75) Inventors: Mitsugu Abe, Atsugi (JP); Nobuyoshi Nambu, Yokkaichi (JP); Osamu Ito, Yokkaichi (JP); Masaaki Ogitsu, Tsukuba (JP); Kazuo Inomata, Tokyo (JP)

(73) Assignee: Nomura Micro Science Co., Ltd., Atsugi-shi (JP)

( * ) Notice: Subject to any disclaimer, the term of this patent is extended or adjusted under 35 U.S.C. 154(b) by 0 days.

(21) Appl. No.: 10/549,294

(22) PCT Filed: Mar. 18, 2004

(86) PCT No.: PCT/JP2004/003642
§ 371 (c)(1),
(2), (4) Date: Sep. 16, 2005

(87) PCT Pub. No.: WO2004/084287
PCT Pub. Date: Sep. 30, 2004

(65) Prior Publication Data
US 2006/0205325 A1 Sep. 14, 2006

(30) Foreign Application Priority Data
Mar. 18, 2003 (JP) .............................. 2003-074581

(51) Int. Cl.
*B24B 7/22* (2006.01)
(52) U.S. Cl. .................... 451/41; 210/679; 210/681

(58) Field of Classification Search .................. 451/41, 451/56, 60, 446; 210/679, 681
See application file for complete search history.

(56) References Cited

U.S. PATENT DOCUMENTS

| 4,500,396 A | 2/1985 | D'Agostino et al. |
| 4,514,367 A | 4/1985 | Asami et al. |

FOREIGN PATENT DOCUMENTS

| EP | 1179627 | * | 2/2002 |
| JP | 09-314466 | | 12/1997 |
| JP | 11-186201 | | 7/1999 |
| JP | 2000-248467 | | 9/2000 |
| JP | 2004-075859 | | 3/2004 |

* cited by examiner

Primary Examiner—Robert Rose
(74) Attorney, Agent, or Firm—Oblon, Spivak, McClelland, Maier & Neustadt, L.L.P.

(57) ABSTRACT

A material for purification of a semiconductor polishing slurry that without changing of pH value, is capable of efficiently purifying a polishing slurry to thereby not only prevent metal contamination of a polished object as effectively as possible but also achieve recycling of a polishing slurry without any problem; a relevant module for purification of a semiconductor polishing slurry; and a process for purifying a semiconductor polishing slurry with the use thereof. In particular, a material for purification of a semiconductor polishing slurry characterized in that it comprises a fibrous substrate having a functional group capable of forming a metal chelate or such a functional group together with hydroxyl fixed onto at least the surface thereof. This material for purification of a semiconductor polishing slurry is, for example, used in such a manner that it is inserted in a container fitted with polishing slurry inflow port and outflow port while ensuring passage of polishing slurry flow.

20 Claims, 6 Drawing Sheets

MATERIAL FOR PURIFICATION OF SEMICONDUCTOR POLISHING SLURRY, MODULE FOR PURIFICATION OF SEMICONDUCTOR POLISHING SLURRY AND PROCESS FOR PRODUCING SEMICONDUCTOR POLISHING SLURRY

TECHNICAL FIELD

The present invention relates to a material for purification of a semiconductor polishing slurry, which has a functional group capable of forming chelate with metal ions, for example, metals such as iron, aluminum, copper, nickel, zinc, chromium, manganese and tungsten, contained in a polishing slurry (semiconductor polishing slurry) used in a semiconductor production process, or a material has a functional group capable of forming chelate with the above metals and a hydroxyl group fixed onto a fibrous substrate; a module for purification of a semiconductor polishing slurry; and a process for purification of a semiconductor polishing slurry using them.

In the case of this field, the semiconductor production includes at least a process of producing base materials such as wafers, glass for liquid crystals and masks, members of a production device, and a device producing process for producing elements and patterns by fabricating the above materials.

BACKGROUND ART

In recent years, the computer is being made to operate faster, and a semiconductor integrated circuit (IC) to be used is being integrated higher. To conform to the high integration of the IC, it is necessary to make the wiring patterns fine and to adopt a multilayered structure.

To adopt the multilayered structure, the unevenness of the wafer itself as the substrate and each layer of the multilayered structure must be made smaller than ever. If a step portion because of the unevenness becomes large, there is a possibility of various failures such as degradation in coverage (step coverage) on step portions when forming a film, a change in film thickness of the photoresist on the step portions in a lithography process, and the like. To avoid such problems involved in multilayering, a slurry is used to polish the semiconductor to further flatten not only the wafer as the substrate but also the surface of each layer formed on the wafer.

In a semiconductor polishing process, e.g., a wafer production process, an important process which has an influence on the surface roughness of the product wafer includes a polishing step. The polishing step is conducted by contacting the surface of a wafer adhered to a spindle to a polishing pad on the surface of a rotating table and rotating the rotating table while supplying a polishing slurry to the contact portion. The polishing slurry used in the polishing step has a polishing material dispersed in a solution, and colloidal silica, fumed silica or the like is used as the polishing material. And, an alkaline solution is sometimes used to provide an effect of chemically etching the wafer surface.

In the device production process, CMP (Chemical Mechanical Polishing) is used as a method of polishing the semiconductor to further flatten the surface of each layer when a metal wiring layer, an interlayer insulating film or the like is formed to have a multilayer lamination structure. This CMP is basically performed by an apparatus similar to the one used in the polishing step of the wafer production. The polishing material used here includes colloidal silica, fumed silica, fumed almina, precipitated alumina, ceria and the like. In the CMP process, an acid solution is sometimes used in order to provide an effect of chemically etching the metal layer and interlayer insulating films.

The semiconductor polishing slurry might have the inclusion of a very small amount of impurity metal ions, an impurity metal colloid, impurity metal hydroxide and the like such as iron, aluminum, copper, nickel derived from contamination or the like from the polishing materials, the polishing device or the atmosphere. As described in Japanese Patent Laid-Open Application No. Hei 11-186201, for example, when a silicon wafer or the like is polished with a semiconductor polishing slurry containing such impurity metal ions and the like, there is a problem that the polished wafer is contaminated by the impurity metal ions because copper, iron and nickel ions are particularly easy to spread in silicon. To avoid the problem, it is said necessary to control the concentrations of copper, nickel and the like in the polishing slurry to 0.01 to 1 ppb, respectively.

The semiconductor polishing slurry in the CMP process is attempted to be recycled in order to reduce a polishing material cost, an environmental load by decreasing a discharged liquid amount or a time for specifying various conditions involved in replacement of the polishing slurry. But, the fact is that the used semiconductor polishing slurry has an increased amount of tungsten, copper, aluminum and the like generated from the polished metal layer and the insulating films between the layers and is discarded without being recycled.

It is presumed that the impurity metal compounds contained in the semiconductor polishing slurry are present in various forms. It is because the semiconductor polishing slurry has a different pH depending on the types of the impurity metal compounds. That is the semiconductor polishing slurry also has a variable behavior depending on the types of metals, but the impurity metal compounds can be present in forms of, for example, ions, colloids or hydroxides depending on the pH of the semiconductor polishing slurry. Therefore, it is necessary to change a process of removing the impurity metal compounds depending on the forms of the impurity metal compounds present in the semiconductor polishing slurry.

Accordingly, it is considered to employ a method of recycling by removing a very small amount of metal ions in the polishing slurry and purifying. As one of purifying methods, it is considered to employ a method of capturing and removing metal ions by using an ion-exchange resin. This method has an advantage that the metal ions can be removed relatively easily, but because the ion-exchange group is a sulfonic acid group (sulfonyl group) or a carboxylic acid group (carboxyl group), it has a high pH dependency and very poor metal ion adsorption selectivity. Therefore, if there are alkali metal ion such as sodium ion or potassium ions, the ion-exchange resin has a disadvantage that the removal efficiency of other metal ions subject to the removal drops considerably. And, when the ion-exchange resin is used to purify the semiconductor polishing slurry, there is a problem that the polishing performance is largely affected because the pH of the purified polishing slurry changes depending on a type of the functional group fixed onto the resin.

In addition, Japanese Patent Laid-Open Application No. Hei 9-314466 proposes a method of removing heavy metals contained in a semiconductor wafer polishing slurry by using a chelate resin to improve the metal ion adsorption selectivity by improving the defect involved when the ion-exchange resin is used.

However, the chelate resin has a bead-like or particle-like shape which has a chelate functional group introduced into a polymer, such as styrene-divinylbenzene, which has a low polarity and a rigid three-dimensional crosslinked structure, and has a problem that a capturing rate of metal ions is low because of a rate of diffusion into the bead-like or partile-like chelate resin required for selective separation of a very small amount of metals is slow. That is the semiconductor polishing slurry contains a high concentration of a polishing material and a pH adjuster up to several percent, so that the chelate resin developed in order to perform selective separation in a general water system is quite hard to remove by selectively separating a very small amount of ionic metals, colloidal metals or hydroxide metals from the semiconductor polishing slurry.

The present invention has been made in view of the above circumstances and provides a material for purification of a semiconductor polishing slurry that is capable of efficiently purifying the semiconductor polishing slurry by a simple process, for example, capable of not only preventing metal contamination of a semiconductor wafer or the like as effectively as possible without depending on an existing form of the metals but also achieving recycling of the polishing slurry without any problems, and a process for purification of a polishing slurry with the use thereof.

The present invention has been made to remedy the above-described problems and provides a material for purification of a semiconductor polishing slurry that without changing a pH, is capable of efficiently purifying the semiconductor polishing slurry by a simple process, to thereby not only prevent metal contamination of, for example, a semiconductor wafer as effectively as possible but also achieve recycling of the polishing slurry without any problems; a module for purification of a semiconductor polishing slurry; and a process for purification of a polishing slurry with the use thereof.

SUMMARY OF THE INVENTION

According to an aspect of the present invention, there is provided a material for purification of a semiconductor polishing slurry having a functional group capable of forming a metal chelate fixed onto at least the surface of a fibrous substrate.

According to another aspect of the present invention, there is provided a material for purification of a semiconductor polishing slurry having a hydroxyl group and a functional group capable of exchanging ions or capable of forming a metal chelate fixed onto at least the surface of a fibrous substrate. Specifically, the impurity metals present in the semiconductor polishing slurry described above might be present in various forms. For example, if the metals are present as ions, an ion-exchange group or a chelate functional group fixed onto a polymer substrate can adsorb by exchanging the ions or forming a chelate with the relevant metal ions. If the metals are present as a colloid or hydroxide, a hydroxyl group present in the polymer substrate is capable of physically adsorbing a hydroxyl group coordinated or bonded to the metals as the relevant metal colloid or metal hydroxide.

In addition, the polymer substrate forming the material for purification of a semiconductor polishing slurry of the present invention has a fibrous form. Therefore, it becomes possible to remove metals which are present as insoluble matters such as colloids and hydroxides by a filtering effect by, for example, continuously passing the semiconductor polishing slurry through a column in which the material for purification of the semiconductor polishing slurry is filled.

In other words, even when the impurity metals present in the semiconductor polishing slurry have various forms such as ions, colloids, hydroxides and the like (hereinafter referred to as metal ions or the like), the material for purification of a semiconductor polishing slurry of the present invention can be used to remove the impurity metals by chelate adsorption, physical adsorption and filtering effects.

It is desirable that the hydroxyl group fixed onto at least the surface of a fibrous substrate of the material for purification of a semiconductor polishing slurry according to the present invention is an ethylenical hydroxyl group, and it is desirable that 40 mg KOH/g or more of it in terms of a hydroxyl value is fixed onto the surface of the fibrous substrate.

Here, the fibrous substrate having the ethylenical hydroxyl group is a fibrous substrate having a so-called alcoholic hydroxyl group capable of causing an esterification reaction, an amidation reaction and an acetylation reaction.

When the hydroxyl value is less than 40 mgKOH/g and the metals in the semiconductor polishing slurry are present in a colloidal form or hydroxide form, their physical adsorption performance becomes poor. Even if the hydroxyl group value is 1000 mgKOH/g or more, the physical adsorption performance is not improved to exceed a prescribed level.

The functional group capable of forming a metal chelate fixed onto the fibrous substrate according to the present invention is preferably, for example, a group containing aminocarboxylic acids (including amino polycarboxylic acids), amines, hydroxylamines, phosphoric acids and thio compounds. Here, aminomonocarboxylic acids among the aminocarboxylic acids include iminoacetic acid and aminoacetic acid; and the amino polycarboxylic acids include nitrilotriacetic acid, ethylene diamine tetra-acetic acid, diethylenetriamine-pentaacetic acid, triethylenetetramine hexaacetic acid, glutamic-diacetic acid, ethylenediamine disuccinate and iminodiacetic acid. The amines include ethylene diamine, diethylenetriamine, triethylenetetramine, polyethylene polyamine, polyethylenimine, polyallylamine, pyrrole, polyvinylamine and Schiff base. The hydroxylamines include oxime, amideoxime, oxine(8-oxyquinoline), glucamine, hydroxyethylamine and hydroxamic acid. The phosphoric acids include aminophosphate and phosphoric acid. The thio compounds include thiol, thiocarboxylic acid, dithiocarbamic acid and thiourea.

Besides, a material capable of introducing a functional group capable of forming a metal chelate is used alone or in a mixed form. The fibrous substrate used for the material for purification of a semiconductor polishing slurry according to the present invention includes, for example, cellulose, polyvinyl alcohol, polyethylenimine, polyester, polyvinyl chloride, polyacrylonitrile, polyamide, polyolefine and the like, and when an ethylenical hydroxyl group and an appropriate value of the above-described hydroxyl value are taken into consideration, cellulose or polyvinyl alcohol is the most desirable.

The fiber used for the above-described substrate includes, for example, a long fibrous monofilament, multifilament, a short fibrous spun yarn or a woven or knitted fabric by weaving or knitting them, and a nonwoven fabric, and fiber or woven or knitted fabric which have two types or more of fibers combined or blended can also be used. Considering the contact efficiency with above-described metal ions and the like and the capturing rate, the used fiber, and particularly the long fiber has preferably a monofilament diameter of 1 to 500 µm, and more preferably 5 to 200 µm, and a length of more than 10 mm is suitable.

In addition, it is also effective to use the above-described substrate fiber in a short fibrous state in order to improve the contact efficiency with the polishing slurry to be processed. A preferable shape of the short fiber used here has a length of 0.05 to 10 mm, preferably 0.1 to 3 mm, a monofilament diameter of about 1 to 500 μm, preferably 5 to 200 μm, and an aspect ratio of about 1.1 to 600, preferably about 1.5 to 100.

If necessary, a long fiber exceeding 5 mm can also be used.

The long fiber type material has a feature that it is easily fabricated into a sheet or felt shape, and the short fiber type material has a feature that its contact efficiency with the polishing slurry is higher than that of the long fiber type material. With the above features taken into consideration, it is preferable to use the short fiber type material when it is aimed to remove a very low concentration of metal ions and the like in the polishing slurry in the polishing process for the wafer production. In the polishing process for the wafer production, such as the CMP process for the device production, it is not necessary to remove the metal ions and the like to decrease to a very low concentration (the concentration of metal ions and the like in the polishing slurry is generally 100 times or more). When the demand of the metal ions and the like on the chelate-forming fiber is much and an exchange frequency is relatively high, the long fiber type material which is easily fabricated so as to be handled conveniently is desirable.

At any rate, substantially all the chelate-forming functional groups introduced onto the surface of thin fiber molecules effectively act on capturing of the metal ions and the like and exert remarkable ability of capturing the metal ions and the like in comparison with the chelate resin.

It is also possible to use a long fiber type material which has at least a part of the acid type functional group determined as alkali metal salt or ammonium salt depending to the pH of the semiconductor polishing slurry to be processed.

The material for purification of a semiconductor polishing slurry can also be used solely in one type, but one having the above-described different chelate-forming functional groups or different fibrous substrates and shapes can also be used in combination of two types or more to form a laminated layer or a mixed form depending on the properties of the semiconductor polishing slurry to be processed and the types of metals to be captured.

As a specific mode of applying to the process for purification of a semiconductor polishing slurry of the present invention, there is a module having the above-described chelate-forming fiber for purification of a semiconductor polishing slurry charged to fix in the container. In this case, the chelate-forming fiber for purification of a semiconductor polishing slurry is formed in a sheet or felt shape and disposed in a passage of the semiconductor polishing slurry, and the semiconductor polishing slurry may be passed through the fiber material formed to have the sheet or felt shape.

As another mode, for example, short fibrous chelate-forming fiber is filled in a container which is provided with an inflow port and an outflow port for the polishing slurry to allow the flowing of the polishing slurry and are prevented from getting out of the container by means of a filter or a strainer.

Either of the above processes can supply all the processed polishing slurry to the semiconductor polishing process while removing the metal ions and the like present in the object semiconductor polishing slurry or can supply at least a part or whole of the polishing slurry to the original semiconductor polishing slurry, circulate it to enhance the level of removing the metal ions and the like and supply to the semiconductor polishing process.

Thus, the metal ions and the like contained in the semiconductor polishing slurry are chelate-captured effectively by the chelate-forming functional group fixed in the chelate-forming fibrous substrate.

Besides, to apply the process for purification of a semiconductor polishing slurry according to the present invention, it is desirable to control so that the pH does not change through the purification process. To control a change in pH in the purification process, for example, the following processes are available.

Specifically, if the polishing slurry to be purified is acidic, there is a process that a functional group capable of forming a metal chelate in the chelate-forming fiber is determined to be an acid type (H type), and if the polishing slurry to be purified is alkaline, there is a process that a functional group capable of forming a metal chelate in the chelate-forming fiber is determined to be an alkali metal salt or an ammonium salt. And, there is also a process that a change in pH of the purified polishing slurry can be controlled while preventing a different type of acid or an alkali metal salt from increasing by determining the end group of a functional group capable of forming a metal chelate in the chelate-forming fiber to be an acid type which controls the pH of the polishing slurry to be purified, or the same as alkali metal salt or ammonium salt.

And, as another process of suppressing a change in the pH of the purified polishing slurry, a change in pH of the purified polishing slurry using the chelate-forming fiber is presumed and the pH of the polishing slurry is adjusted before purification.

BEST MODE FOR CARRYING OUT THE INVENTION

Embodiments of the present invention will be described with reference to the accompanying drawings.

Figure 1:
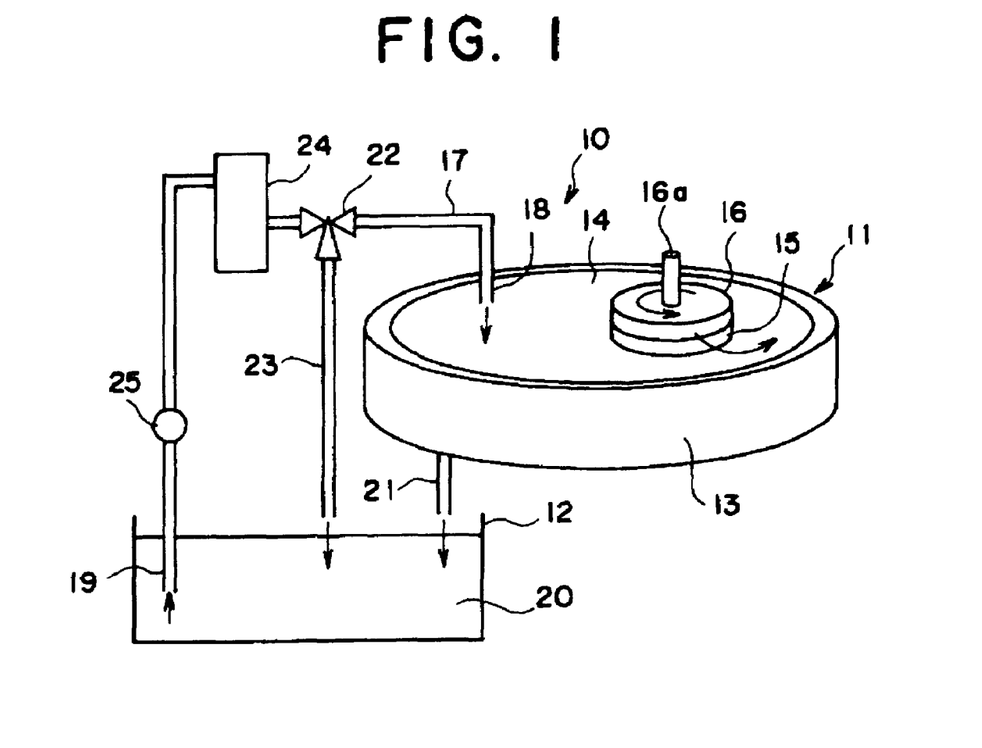
FIG. 1 is a diagram schematically showing a polishing device of a semiconductor wafer according to an embodiment of the present invention.

FIG. 1 is a diagram schematically showing an example of a polishing device of a semiconductor wafer according to an embodiment of the present invention.

In FIG. 1, reference numeral 10 denotes a semiconductor wafer polishing device of this embodiment, and the polishing device 10 is provided with a polishing device body 11 and a polishing slurry tank 12 which holds a polishing slurry. The polishing device body 11 is comprised of a polishing slurry receiver 13 and a platen 14 which is disposed within the receiver 13 and has a polishing cloth or pad adhered to its top surface to cover the surface entirely.

A pressing member 16 for pressing a wafer 15, which is placed on the polishing cloth or pad, against the polishing cloth or pad is disposed on the top of the platen 14. The pressing member 16 presses the wafer 15 to the polishing cloth or pad, rotates on its rotation axis 16a and also moves in a circumferential direction of the platen 14 to uniformly polish the surface of the wafer 15. A polishing slurry outflow port 18 which is formed at one end of a polishing slurry feeding pipe 17 is open above the platen 14, and a polishing slurry suction opening 19 which is open at the other end of the polishing slurry feeding pipe 17 is guided into the polishing slurry tank 12 to open in a polishing slurry 20. The bottom of the polishing slurry receiver 13 has a polishing slurry recovery pipe 21 which discharges the polishing slurry in the receiver 13 to the polishing slurry tank 12. A polishing slurry recovery pipe 23 is connected to the polishing slurry feeding pipe 17 via a three-way valve (may be two two-way valves) 22 and its end is open above the polishing slurry tank 12.

A metal removing device 24 is disposed upstream of the three-way valve 22 of the polishing slurry feeding pipe 17 to remove metal ions and the like contained in the polishing slurry 20 sucked up from the polishing slurry tank 12 by a pump 25 which is disposed upstream of the metal removing device 24.

In this embodiment, the polishing slurry 20 which is drawn up from the polishing slurry tank 12 by the pump 25 is dripped onto the platen 14 from the polishing slurry outflow port 18 through the polishing slurry feeding pipe 17 via the metal removing device 24. The polishing slurry 20 has metals present in a very small amount removed when flown through the metal removing device 24, so that the polishing slurry not containing metal ions and the like is supplied to the platen 14.

The polishing slurry 20 supplied onto the platen 14 is taken between the polishing cloth or pad and the wafer 15 as the pressing means 16 rotates, and the wafer is mirror-polished under pressure by the pressing member 16. Then, the polishing slurry 20 is collected by the polishing slurry receiver 13 and recovered in the polishing slurry tank 12 through the polishing slurry recovery pipe 21.

Thus, the polishing slurry not containing metal ions or the like is supplied to the wafer 15, and the wafer 15 is prevented from contamination or readhesion of the metal ions and the like.

In this circulating process of the polishing slurry 20, the polishing slurry 20 having passed through the metal removing device 24 can be partly or wholly returned to the polishing slurry tank 12 through the polishing slurry bypass pipe 23. If a concentration of metal ions or the like in the polishing slurry 20 having passed through the metal removing device 24 is higher than a desired concentration, the polishing slurry 20 is partly or wholly returned to the polishing slurry tank 12 through the polishing slurry bypass pipe 23, circulated so as to enhance its purity and supplied to the polishing device body 11.

Figure 2:
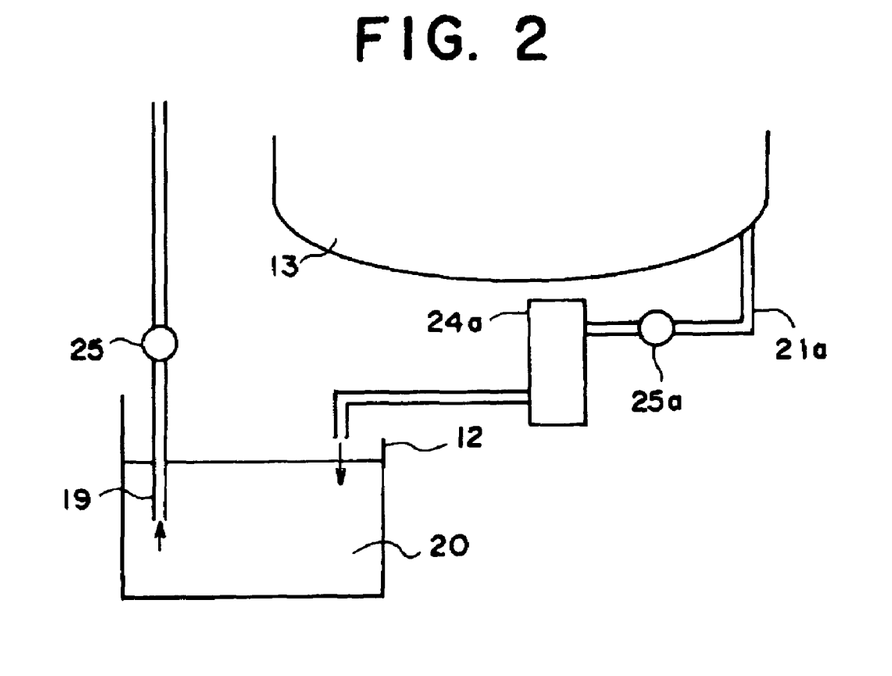
FIG. 2 is a diagram schematically showing a main portion of a polishing device of a semiconductor wafer according to another embodiment of the present invention.

FIG. 2 shows a main portion of another embodiment of the present invention, in which to prevent the contamination by the metals contained in the polishing slurry recovered in the polishing slurry tank 12, a metal removing device 24a is disposed at the middle part of a polishing slurry recovery pipe 21a for feeding the polishing slurry 20 from the polishing slurry receiver 13 to the polishing slurry tank 12. In FIG. 2, reference numeral 25a is a pump. In the following figures, like parts as those of FIG. 1 are denoted by like reference numerals, and overlapped descriptions thereof will be omitted.

FIG. 3 through FIG. 6 show example structures of the metal removing device 24 (24a) used in these embodiments.

Figure 3:
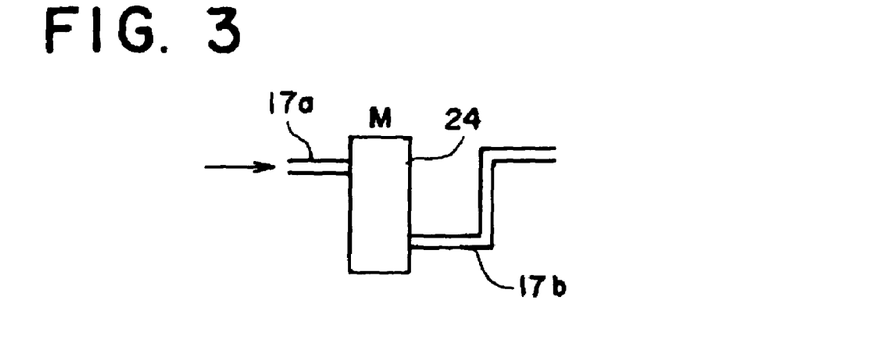
FIG. 3 is a diagram showing a structure of a metal removing device used in an embodiment of the present invention.

FIG. 3 shows the metal removing device 24 configured with the chelate fiber of the present invention charged into, for example, a container having a polishing slurry inflow port 17a and a polishing slurry outflow port 17b.

Figure 4:
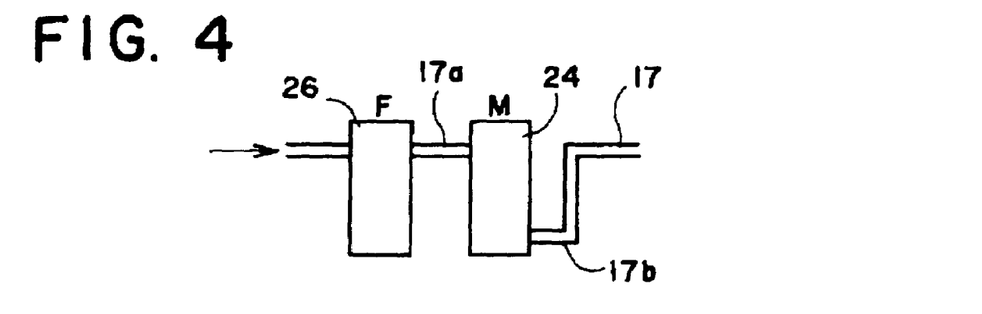
FIG. 4 is a diagram showing a structure of a metal removing device used in an embodiment of the present invention.

FIG. 4 shows that a filter 26, which removes particles generated from the polished portions and the device and adjusts the slurry so to have the same grain size distribution as that before the use of the slurry, is provided upstream of the metal removing device 24 which is configured with the chelate fiber of the present invention charged into, for example, a container having the polishing slurry inflow port 17a and the polishing slurry outflow port 17b.

Figure 5:
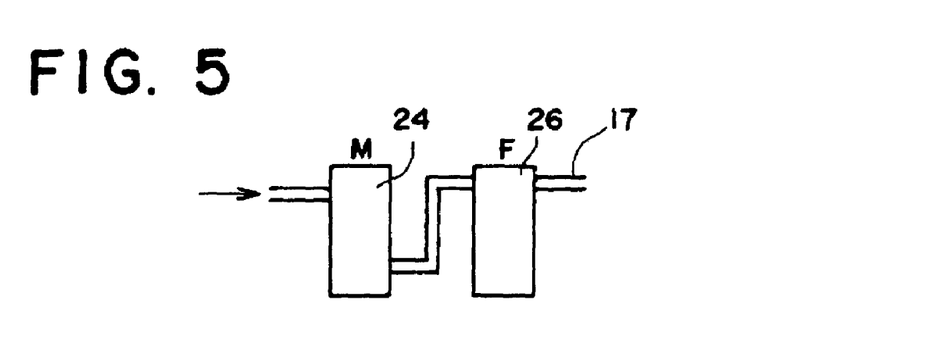
FIG. 5 is a diagram showing a structure of a metal removing device used in an embodiment of the present invention.

FIG. 5 shows that the metal removing device 24 in which the slurry purification chelate fiber of the present invention is charged is disposed upstream, and the filter 26, which removes particles generated from the polished portions or the device, adjusts the slurry to the same grain size distribution as that before the use of the slurry or removes particles generated from the metal removing device 24, is disposed downstream.

Figure 6:
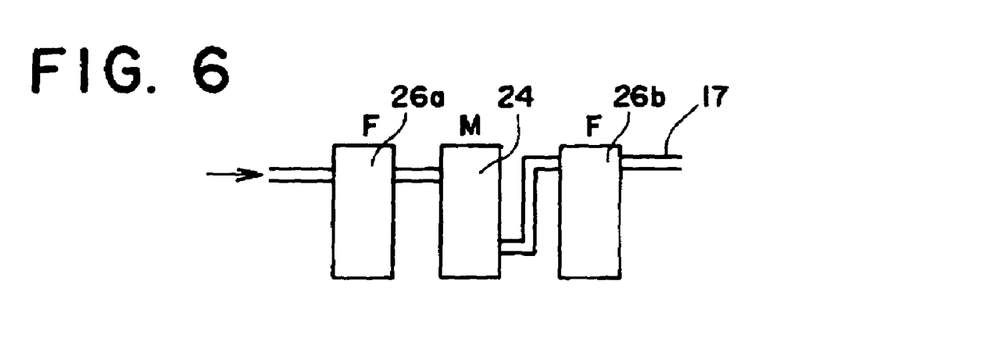
FIG. 6 is a diagram showing a structure of a metal removing device used in an embodiment of the present invention.

FIG. 6 shows that a filter 26a which removes particles generated from the polished portions and the device and adjusts the slurry to the same grain size distribution as that before the use of the slurry is disposed upstream, the metal removing device 24 in which the slurry purifying chelate fiber of the present invention is charged is disposed at the midpoint, and a filter 26b, which removes particles generated from the polished portions and the device, adjusts the slurry to the same grain size distribution as that before the use of the slurry or removes particles generated from the metal removing device 24, is disposed downstream.

According to the present invention, as a method of suppressing a pH change of the purified polishing slurry from the pH of the polishing slurry before the purification, there are a method that when the polishing slurry is acidic, a functional group capable of forming a metal chelate in the chelate-forming fiber of the present invention is determined as acid type (H type) and, when the polishing slurry to be purified is alkaline, a functional group capable of forming a metal chelate in the chelate-forming fiber is determined as alkali metal salt or ammonium salt, and a method that an end group of a functional group capable of forming a metal chelate in the chelate-forming fiber of the present invention is determined as an acid type controlling the polishing slurry to be purified or the same as alkali metal salt or ammonium salt. Thus, the purified polishing slurry can be suppressed from having a pH change while preventing different kinds of acids or alkali metal salt from increasing.

Figure 7:
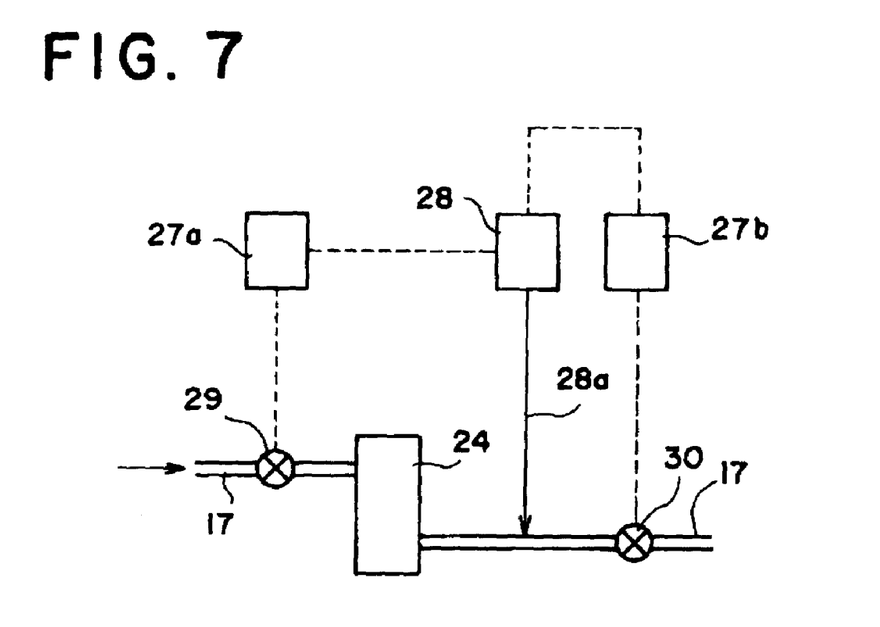
FIG. 7 is a diagram showing an apparatus for controlling a change in pH of a polishing slurry after purification in another embodiment of the present invention.

However, for backup in case of a demand for additional pH adjusting accuracy or a change of pH due to the degradation of the ability of the chelate-forming fiber because of some reason, the device shown in, for example, FIG. 7 can be used to suppress a pH change of the purified polishing slurry.

Specifically, FIG. 7 shows another embodiment of the present invention using the device for suppressing a pH change of the purified polishing slurry.

In FIG. 7, pH measuring instruments 27a, 27b are respectively disposed in the vicinities of the polishing slurry inflow port and the polishing slurry outflow port of the metal removing device 24. According to the measured values by the pH measuring instruments 27a, 27b, the injection amount of a required pH adjuster is determined by an unshown control section. Based on the measured result, a pH adjusting pump 28 disposed between the metal removing device 24 and the pH measuring instrument 27b operates to inject the pH adjuster into the pipe line 17 via a quantitative injection means 28a by feedforward control or feedback control, to suppress the pH change of the purified polishing slurry. Reference numerals 29, 30 are sample collection valves.

FIG. 8 through FIG. 11 show a charged state of a chelate fiber in the metal removing device 24 used in the present invention.

Figure 8:
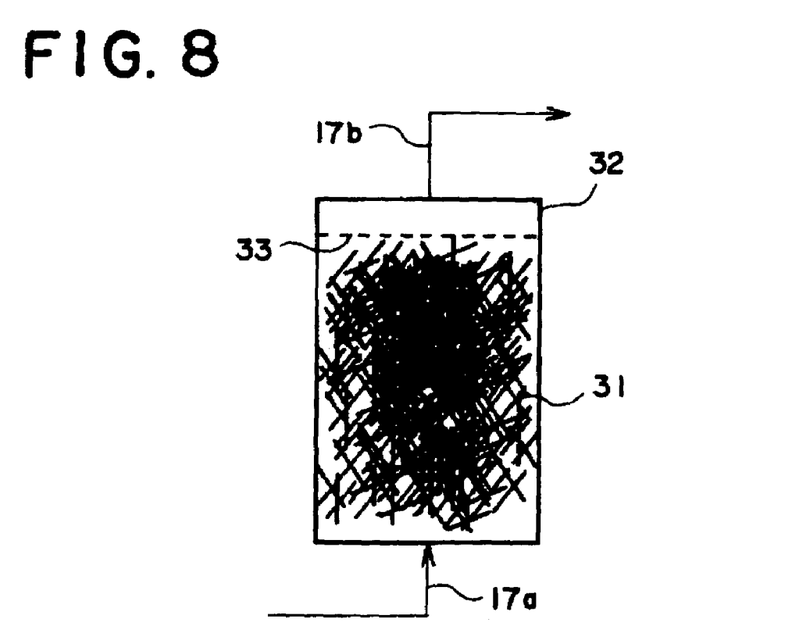
FIG. 8 is a diagram showing a charged state of a chelate fiber according to an embodiment of the present invention.
Figure 9:
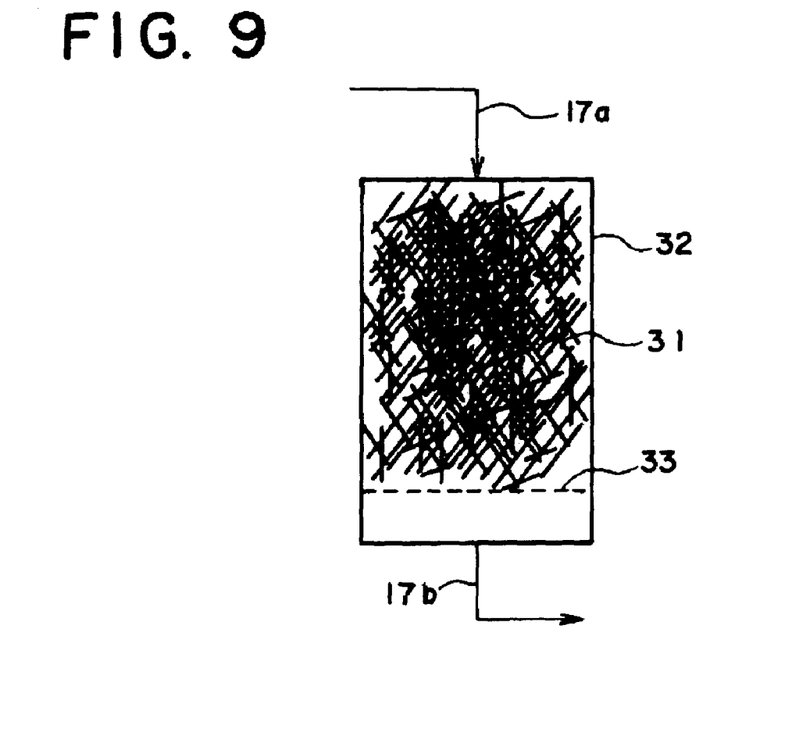
FIG. 9 is a diagram showing a charged state of a chelate fiber according to an embodiment of the present invention.

FIG. 8 and FIG. 9 show a module which is configured to prevent a chelate fiber 31 used in the present invention, which is filled into a container 32, from flowing into piping by means of a porous plate 33 for prevention of the chelate fiber from flowing out. A strainer may be used instead of the porous plate 33. FIG. 8 shows an upward flow having good contact separation efficiency, and FIG. 9 shows a downward flow having a less pressure loss involved in the passage of the slurry. Either of them can be selected as required.

In the present invention, the chelate fiber for purification of the semiconductor polishing slurry can be used alone, but the chelate fiber of the above-described different chelate-forming functional groups or different fibrous substrates and shapes can be used as a combination of two kinds or more depending on the properties of the semiconductor polishing slurry to be treated and the kinds of metals to be captured.

Figure 10:
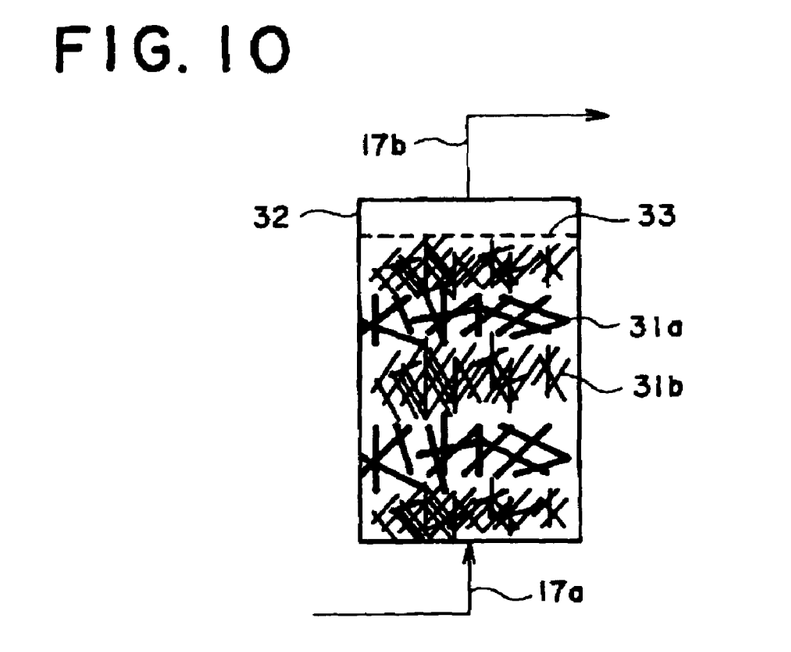
FIG. 10 is a diagram showing a charged state of a chelate fiber according to an embodiment of the present invention.
Figure 11:
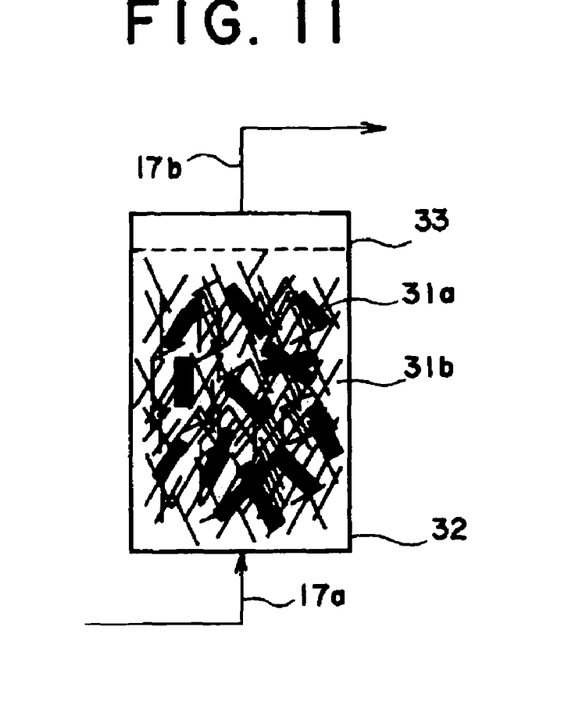
FIG. 11 is a diagram showing a charged state of a chelate fiber according to an embodiment of the present invention.

In this case, for example, the chelate fiber having different chelate-forming functional groups, the fibrous substrate or the chelate fiber having different shapes are alternately laminated as shown in FIG. 10 or can also be used in a mixed form as shown in FIG. 11. In FIG. 10 and FIG. 11, 31a and 31b denote different chelate fiber, respectively.

Figure 12:
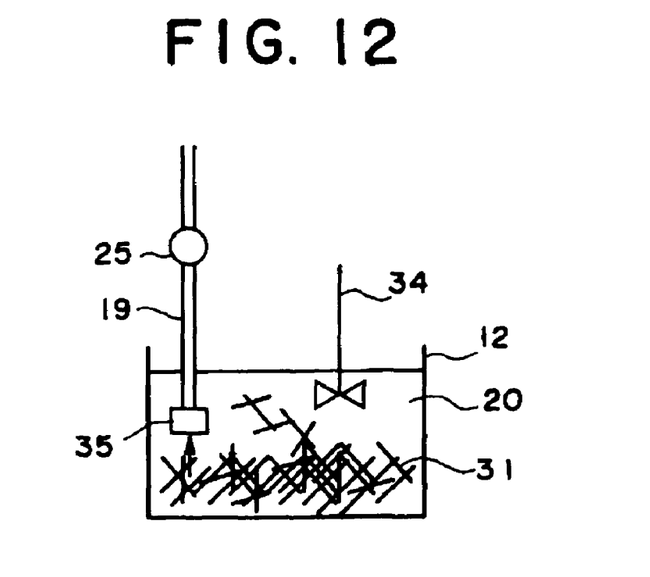
FIG. 12 is a diagram showing a used state of a chelate fiber according to an embodiment of the present invention.

FIG. 12 shows that short fibrous chelate fiber 31 are put in a polishing slurry tank (container) 12a and stirred by a stirrer 34 (or aerator) to flow to expand, and a strainer 35 is fitted to the polishing slurry suction opening 19 of the polishing slurry feeding pipe 17 to prevent the chelate fiber 31 from being sucked into the polishing slurry feeding pipe 17.

Figure 13:
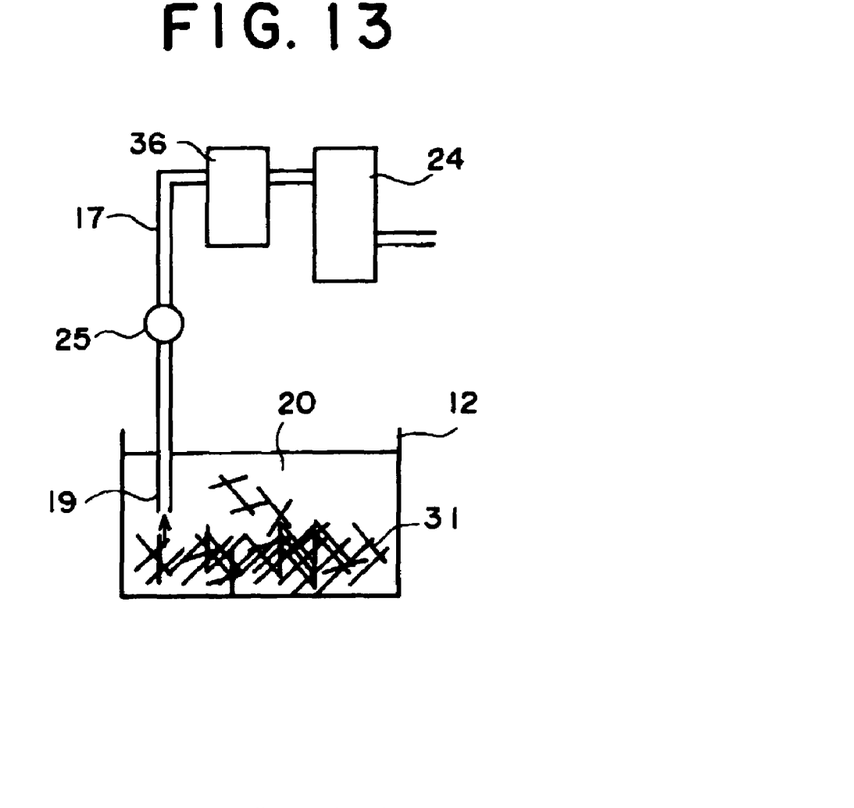
FIG. 13 is a diagram showing a used state of a chelate fiber according to an embodiment of the present invention.
Figure 14:
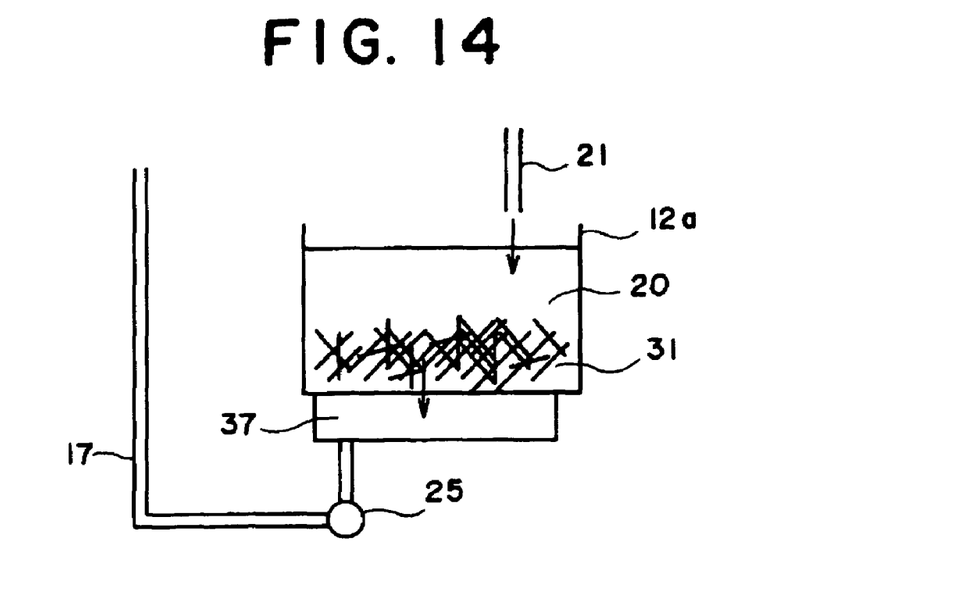
FIG. 14 is a diagram showing a used state of a chelate fiber according to an embodiment of the present invention.

FIG. 13 shows that a filter 36 is disposed at the middle of the pipe 17 instead of fitting the strainer 35 to the polishing slurry suction opening 19 of the polishing slurry feeding pipe 17 in such a way that the short fibrous chelate fiber 31 are prevented from entering the metal removing device 24. FIG. 14 shows that a filter 37, which is formed of chelate-forming fiber fabricated into a permeable sheet or felt, is disposed under the polishing slurry tank (container) 12a, and the semiconductor polishing slurry 20 is sucked into the polishing slurry feeding pipe 17 through the filter 37 to enhance the removal efficiency of the metal ions and the like and to prevent the short fibrous chelate fiber 31 from getting out of the polishing slurry tank (container) 12a.

EXAMPLES

The present invention will be described more specifically with reference to examples. It is to be understood that the present invention is not limited to the examples, and various modifications can be made without deviating from the spirit and scope of the invention.

Examples 1 Through 7

Material for Purification of Polishing Slurry in the Production of a Semiconductor Silicon Wafer and Ability of Removing Metals Contained in the Polishing Slurry The slurry 20 having 3 wt % of a colloidal silica stock solution simulating the polishing slurry diluted to ten times with ultrapure water was accumulated in the polishing slurry tank 12 of the apparatus shown in FIG. 1. As to the metal impurity concentrations of the slurry, iron, copper and nickel, which were big obstacles contaminating the silicon wafer, were 0.01 ppb, respectively.

Iron, copper and nickel were added so to become 30 ppb to 50 ppb in the slurry 20 with contamination by the production apparatus and environment taken into consideration and thoroughly stirred to uniformly disperse in the slurry 20.

Meanwhile, the metal removing devices 24 in which the various types of chelate fiber shown in Table 1 were filled respectively were connected in parallel in the midpoint of the polishing slurry feeding pipe 17.

TABLE 1

|  | Functional group | Substrate | Shape |
| --- | --- | --- | --- |
| Comparative Example 1 | Iminoacetic Acid | Divinylbenzene-styrene copolymer | Beads |
| Example 1 | Iminoacetic Acid | Polyvinyl alcohol + polyethylenimine | Fiber |
| Comparative Example 2 | Iminoacetic Acid | Divinylbenzene-styrene copolymer | Beads |
| Example 2 | Iminoacetic Acid | Polyvinyl alcohol + polyethylenimine | Fiber |
| Comparative Example 3 | Iminodiacetic Acid | Divinylbenzene-styrene copolymer | Beads |
| Example 3 | Iminodiacetic Acid | Cellulose | Fiber |
| Comparative Example 4 | Amideoxime | Divinylbenzene-styrene copolymer | Beads |
| Example 4 | Amideoxime | Polyacrylonitrile | Fiber |
| Comparative Example 5 | Aminophosphate | Divinylbenzene-styrene copolymer | Beads |
| Example 5 | Aminophosphate | Polyvinyl alcohol + polyethylenimine | Fiber |
| Comparative Example 6 | Thiocarboxylic Acid | Divinylbenzene-styrene copolymer | Beads |
| Example 6 | Thiocarboxylic Acid | Polyvinyl alcohol + polyethylenimine | Fiber |
| Example 7 | Iminoacetic acid + aminophosphate | Polyvinyl alcohol + polyethylenimine | Fiber |

In Table 1, the molecular structures of the functional groups and substrates and the hydroxyl values of the substrates having the hydroxyl group are as follows.

(Iminoacetic Acid: H Type)

[Chemical Formula 1]

(Iminoacetic Acid: Na Type)

[Chemical Formula 2]

(Iminodiacetic Acid)

[Chemical Formula 3]

(Amideoxime)

[Chemical Formula 4]

(Aminophosphate)

[Chemical Formula 5]

(Thiocarboxylic Acid)

[Chemical Formula 6]

(Divinylbenzene-Styrene Copolymer) [Beads]

[Chemical Formula 7]

(Polyvinyl Alcohol+Polyethylenimine)

[Chemical formula 8]

(Cellulose)

[Chemical Formula 9]

(Polyacrylonitrile)

[Chemical Formula 10]

$$\mathrm{+CH_2-CH+\atop CN}_n$$

(Hydroxyl Value: mgKOH/g)
Cellulose (Example 3): 520
Polyvinyl alcohol+polyethylenimine (Example 6): 200
Polyvinyl alcohol+polyethylenimine (Example 7): 220

All the used chelate fiber were a short fiber type having a monofilament diameter of 0.1 mm, a length of 1 mm and an aspect ratio of 10, and a copper-chelate amount was uniformly 0.8 mmol/g-fiber·dry. In comparative examples 1 through 6, a bead-like chelate resin was used instead of the chelate fiber to measure the ability of removing the metal ions and the like under the same conditions as in examples. The bead-like chelate resin used in the comparative examples was spherical with an effective diameter of 0.5 mm and had a copper-chelate amount of 0.8 mmol/g-resin·dry.

Example 1 shows the end group determined as the H type for comparison because only iminoacetic acid which represents aminocarboxylic acid has a difference in removability depending on the end group. Example 7 is an example that iminoacetic acid and aminophosphate fibers are mixed at a weight ratio of 1:1.

A module of the used metal removing device 24 is a sealable cylindrical container having a diameter of 75 mm and a length of 500 mm and used to flow the slurry upward as shown in FIG. 8. It is determined to pass a total amount through the module one time only, and a fluid flow rate is a space velocity (SV) of 40 h$^{-1}$.

Then, the metal-added polishing slurry 21 was passed through the individual metal removing devices 24, and pH and sodium, iron, copper and nickel concentrations were measured. The results are shown in Table 2.

TABLE 2

| | pH | Na ppb | Na Change Rate(%) | Cu ppb | Cu Removal Ratio(%) | Ni ppb | Ni Removal Ratio(%) | Fe ppb | Fe Removal Ratio(%) |
|---|---|---|---|---|---|---|---|---|---|
| BP | 10.5 | $9.0 \times 10^5$ | — | 50 | — | 40 | — | 35 | — |
| CE1 | 9.4 | $9.0 \times 10^4$ | 44 | 40 | 20 | 23 | 43 | 22 | 37 |
| E1 | 8.1 | $1.2 \times 10^4$ | 87 | 14 | 72 | 12 | 70 | 9 | 74 |
| CE2 | 10.5 | $9.0 \times 10^5$ | 0 | 34 | 32 | 8.6 | 79 | 29 | 17 |
| E2 | 10.5 | $9.0 \times 10^5$ | 0 | <0.5 | >99 | <0.5 | >99 | 1.8 | 95 |
| CE3 | 10.4 | $8.4 \times 10^5$ | 0.7 | 43 | 14 | 10 | 75 | 33 | 5.7 |
| E3 | 10.4 | $8.4 \times 10^5$ | 0.7 | 13 | 74 | <0.5 | >99 | 6.7 | 81 |
| CE4 | 10.4 | $9.0 \times 10^5$ | 0 | 31 | 38 | 5.2 | 87 | 17 | 51 |
| E4 | 10.4 | $9.0 \times 10^5$ | 0 | 0.7 | 99 | 0.6 | 99 | 0.8 | 98 |
| CE5 | 10.5 | $9.0 \times 10^5$ | 0 | 32 | 36 | 3 | 83 | 8 | 77 |
| E5 | 10.5 | $9.0 \times 10^5$ | 0 | 0.7 | 99 | <0.5 | >99 | <0.5 | >99 |
| CE6 | 10.5 | $9.0 \times 10^5$ | 0 | 38 | 24 | 10 | 75 | 33 | 5.7 |
| E6 | 10.5 | $9.0 \times 10^5$ | 0 | 0.8 | 98 | <0.5 | >99 | 0.9 | 97 |
| E7 | 10.5 | $9.0 \times 10^5$ | 0 | <0.5 | >99 | <0.5 | >99 | <0.5 | >99 |

BP: Before passage;
CE: Comparative Example;
E: Example

It is apparent from the above examples and comparative examples that when the bead-like resins and the fibers are compared for removal of the metals, the fibers have an overwhelmingly high removing ability. And, when the functional groups are iminoacetic acid and the end groups are compared between H and Na types, it is seen that the Na type is free from a change in pH and Na concentration and has high iron, copper and nickel removing ability in comparison with the H type. In addition, when individual types of functional groups fixed onto the fibrous substrate are compared for the metal removability, the selectivity depends on the types of functional groups, and it is hard to achieve the removal of all the three of iron, copper and nickel by one type of functional group alone to a metal concentration of less than 0.5 ppb which is one of the targets for the removability. But, when, for example, aminophosphate fiber excelling in removal of iron and nickel and iminoacetic acid fiber excelling in removal of copper and nickel are mixed at a weight ratio of 1:1 and charged, the metal concentration of all of iron, copper and nickel can be controlled to less than 0.5 ppb, and a change in pH and sodium amount can be eliminated.

Examples 8 Through 12

Material for Purification of Polishing Slurry and Removability of Metals in Polishing Slurry in CMP Process for Production of Semiconductor Device In a process of producing a device on an Si wafer by the apparatus shown in FIG. 1, the CMP process was conducted to polish metal wiring which is comprised of copper, tungsten and the like. The polishing slurry tank 12 had a polishing slurry amount of 50 liters, a copper and tungsten concentration before polishing was 1 ppm or less, and 60 ppm of iron was added as a polishing aid. In the polishing slurry used for polishing without charging the chelate fiber in the metal removing device 24, the concentrations of tungsten and copper were increased to 200 ppm and 12 ppm respectively, and pH was acid of 2.3.

Then, the metal removing device 24 was filled with various types of polishing slurry purifying materials 47, and the three-way valve 22 which was disposed at the midpoint of the polishing slurry feeding pipe 17 was used for each of the individual semiconductor polishing slurry materials to return the whole semiconductor polishing slurry to the polishing slurry tank 12 through the bypass pipe 23 returning to the polishing slurry tank 12. This circulation was conducted three times, and the concentrations of metals in the polishing slurry were measured. After every test conducted changing each felt-like chelate-forming fiber type, the polishing slurry in the tank and the apparatus system was completely renewed, and the metal concentration and other conditions were not changed.

As the functional group of the chelate fiber of the material for purification of the semiconductor polishing slurry, iminoacetic acid representing aminocarboxylic acids, aminophosphate representing phosphoric acids, glucamine representing hydroxylamines and ethylene diamine representing amines were used. And, the end group was determined as the H type. The fibrous substrates used are shown in Table 3.

TABLE 3

| | Functional Group | Substrate | Shape |
|---|---|---|---|
| Example 8 | Iminoacetic acid | Polyvinyl alcohol + polyethylenimine | Fiber |
| Example 9 | Aminophosphate | Polyvinyl alcohol + polyethylenimine | Fiber |
| Example 10 | Glucamine | Cellulose | Fiber |
| Example 11 | Ethylene diamine | Polyamide | Fiber |
| Example 12 | Iminoacetic acid + ethylene diamine | Polyvinyl alcohol + polyethylenimine | Fiber |

In Table 3, the molecular structures of the functional groups and substrates and the hydroxyl values of the substrates having the hydroxyl group are as follows.

(Glucamine)

[Chemical Formula 11]

(Ethylene diamine)

(Polyamide)

(Hydroxyl Value: mg KOH/g)

Polyvinyl alcohol+polyethylenimine (Example 8): 210

Polyvinyl alcohol+polyethylenimine (Example 9): 200

Cellulose (Example 10): 670

Polyvinyl alcohol+polyethylenimine (Example 12): 220

The chelate fiber had a long fiber type having a monofilament diameter of 0.5 mm, a length of 10 cm and an aspect ratio of 200 woven into a felt shape. The chelate-forming fibers uniformly having a copper-chelate amount in 0.8 mmol/g-fiber·dry were charged to the bottom of a slurry tank 12a having a diameter of 50 cm as shown in FIG. 14. The charged chelate-forming fibers had a thickness of 30 cm and a charged amount of 2000 g. The amount of polishing slurry flowing to the polishing slurry tank 12a was determined to 5 L/min. Here, it is aimed to remove copper and tungsten to less than 1 ppm which is an amount before the polishing and to keep iron at 60 ppm.

Then, the metal-added polishing slurry 21 was passed through the individual metal removing devices 24, and pH and tungsten, copper and iron concentrations were measured. The results are shown in table 4.

TABLE 4

|  |  | W | | Cu | | Fe | |
| --- | --- | --- | --- | --- | --- | --- | --- |
|  | pH | ppm | Removal ratio (%) | ppm | Removal ratio (%) | ppm | Removal ratio (%) |
| Before polishing | 2.3 | <1 | — | <1 | — | 60 | — |
| Before passing | 2.3 | 200 | — | 12 | — | 60 | — |
| Example 8 | 2.3 | 120 | 40 | <1 | >92 | 57 | 5 |
| Example 9 | 1.8 | <1 | >99 | <1 | >92 | <1 | >98 |
| Example 10 | 2.3 | <1 | >99 | <1 | >92 | <1 | >98 |
| Example 11 | 2.3 | <1 | >99 | 10 | 17 | 58 | 3.3 |
| Example 12 | 2.2 | <1 | >99 | <1 | >92 | 58 | 3.3 |

It is seen from the test results that the iminoacetic acid type has higher copper removing ability than tungsten and iron, the aminophosphate type and the glucamine acid type have high removing ability for all metals, and the ethylene diamine type has poor iron and copper removing ability but good tungsten removing ability. Considering the properties of the individual chelate fibers, a long fiber type polishing slurry purifying material of each of the iminoacetic acid type and the ethylene diamine type was fabricated into a sheet having a thickness of 3 mm. The prepared sheets of them were alternately laminated up to fifth sheets to have a total laminated thickness of 30 cm (the weight ratio of the iminoacetic acid type to the ethylene diamine type is 1:1). This material for purification of a semiconductor polishing slurry was used to purify the semiconductor polishing slurry under the same conditions. Then, the concentration of copper and tungsten became less than 1 ppm which is a value before the polishing, and the concentration of iron could be made to about 60 ppm which was a desired value.

INDUSTRIAL APPLICABILITY

As apparent from the above-described examples, the material for purification of a semiconductor polishing slurry of the present invention has a very large effective surface area in comparison with a conventional resin tape type and has a high contact efficiency with metal ions and the like when the chelate-forming functional group is introduced, so that its capturing rate of metal ions and the like is very high, and it is excellent in metal removing performance.

And, long fibrous monofilament and multifilament, short fibrous spun yarn or a woven or knitted fabric of them, and a nonwoven fabric may be used, and fiber or woven or knitted fabric which has two types or more of fibers combined or blended can also be used. Thus, they can be charged in a container to allow passage of the slurry, flown together with the processed fluid in the container or used in various forms to increase the flexibility of designing the device. And, a functional group, a fibrous substrate or different types can be used in combination, so that the removability can be provided with selectivity.

What is claimed is:

1. A material for purification of an acidic semiconductor polishing slurry used in a semiconductor polishing process, comprising:

a fibrous substrate;

an ethylenical hydroxyl group introduced onto the fibrous substrate for adsorbing at least one of a colloidal metal and a metal compound contained in the acidic semiconductor polishing slurry, the ethylenical hydroxyl group having a hydroxyl value of 40 mg KOH/g or more; and an acid-type (H type) functional group introduced onto the fibrous substrate for ion-exchanging a metal ion contained in the acidic semiconductor polishing slurry or for forming a metal chelate with the metal ion.

2. The material of claim 1, wherein the acid-type functional group for forming a metal chelate is at least one group selected from a group containing aminocarboxylic acids, a group containing phosphoric acids, and a group containing thio compounds, and wherein the fibrous substrate includes at least one selected from a plant-based natural fiber, an animal-based natural fiber, a cellulose-based regenerated fiber, a polyvinyl alcohol-based synthetic polymer fiber, polyethylene imine-based synthetic polymer fiber, polyester-based synthetic polymer fiber, polyvinyl chloride-based synthetic polymer fiber, polyacrylonitrile-based synthetic polymer fiber, polyamide-based synthetic polymer fiber and polyolefin-based synthetic polymer fiber.

3. A material for purification of a basic semiconductor polishing slurry used in a semiconductor polishing process, comprising:

a fibrous substrate;

an ethylenical hydroxyl group introduced onto the fibrous substrate for adsorbing at least one of a colloidal metal and a metal compound contained in the basic semiconductor polishing slurry, the ethylenical hydroxyl group having a hydroxyl value of 40 mg KOH/g or more; and an alkali-metal-type functional group introduced onto the fibrous substrate for ion-exchanging a metal ion contained in the basic semiconductor polishing slurry or for forming a metal chelate with the metal ion, the alkali-metal-type functional group having alkali metal or ammonium at an ion exchange site thereof.

4. The material of claim 3,
wherein the alkali-metal-type functional group for forming a metal chelate is at least one group selected from a group containing aminocarboxylic acids, a group containing phosphoric acids, and a group containing thio compounds, and
wherein the fibrous substrate includes at least one selected from a plant-based natural fiber, an animal-based natural fiber, a cellulose-based regenerated fiber, a polyvinyl alcohol-based synthetic polymer fiber, polyethylene imine-based synthetic polymer fiber, polyester-based synthetic polymer fiber, polyvinyl chloride-based synthetic polymer fiber, polyacrylonitrile-based synthetic polymer fiber, polyamide-based synthetic polymer fiber and polyolefin-based synthetic polymer fiber.

5. A process for purification of an acidic semiconductor polishing slurry used in a semiconductor polishing process, comprising:
preparing a removing module having the material according to claim 1;
passing the acidic semiconductor polishing slurry through the removing module to remove metals present in the acidic semiconductor polishing slurry; and
polishing a semiconductor by use of the acidic semiconductor polishing slurry passed through the removing module.

6. The process of claim 5, further comprising:
passing the acidic semiconductor polishing slurry through the removing module to remove metals present in the acidic semiconductor polishing slurry after polishing the semiconductor.

7. The process of claim 5,
wherein the acid-type functional group for forming a metal chelate is at least one group selected from a group containing aminocarboxylic acids, a group containing phosphoric acids, and a group containing thio compounds, and
wherein the fibrous substrate is at least one selected from a plant-based natural fiber, an animal-based natural fiber, a cellulose-based regenerated fiber, a polyvinyl alcohol-based synthetic polymer fiber, polyethylene imine-based synthetic polymer fiber, polyester-based synthetic polymer fiber, polyvinyl chloride-based synthetic polymer fiber, polyacrylonitrile-based synthetic polymer fiber, polyamide-based synthetic polymer fiber and polyolefin-based synthetic polymer fiber.

8. A process for purification of an acidic semiconductor polishing slurry used in a semiconductor polishing process, comprising:
preparing a removing module having a plurality of the material according to claim 1 forming a layer structure;
passing the acidic semiconductor polishing slurry through the removing module to remove metals present in the acidic semiconductor polishing slurry; and
polishing a semiconductor by use of the acidic semiconductor polishing slurry passed through the removing module.

9. The process of claim 5,
wherein the material is formed into a self-supportable sheet.

10. The process of claim 5,
wherein the material is charged in a container provided with an inflow port and an outflow port for the polishing slurry so as to allow the polishing slurry to flow through.

11. The process of claim 5,
wherein the material is disposed in a flowable state within an area partitioned by a filter or a strainer through which the polishing slurry flows in a container provided with an inflow port and an outflow port for the semiconductor polishing slurry.

12. A process for purification of a basic semiconductor polishing slurry used in a semiconductor polishing process, comprising:
preparing a removing module having the material according to claim 3;
passing the basic semiconductor polishing slurry through the removing module to remove metals present in the basic semiconductor polishing slurry; and
polishing a semiconductor by use of the basic semiconductor polishing slurry passed through the removing module.

13. The process of claim 12, further comprising;
passing the basic semiconductor polishing slurry through the removing module to remove metals present in the basic semiconductor polishing slurry after polishing the semiconductor.

14. The process of claim 12,
wherein the alkali-metal-type functional group for forming a metal chelate is at least one group selected from a group containing aminocarboxylic acids, a group containing phosphoric acids, and a group containing thio compounds, and
wherein the fibrous substrate includes at least one selected from a plant-based natural fiber, an animal-based natural fiber, a cellulose-based regenerated fiber, a polyvinyl alcohol-based synthetic polymer fiber, polyethylene imine-based synthetic polymer fiber, polyester-based synthetic polymer fiber, polyvinyl chloride-based synthetic polymer fiber, polyacrylonitrile-based synthetic polymer fiber, polyamide-based synthetic polymer fiber and polyolefin-based synthetic polymer fiber.

15. A process for purification of a basic semiconductor polishing slurry used in a semiconductor polishing process, comprising:
preparing a removing module having a plurality of the material according to claim 3 forming a layer structure;
passing the basic semiconductor polishing slurry through the removing module to remove metals present in the basic semiconductor polishing slurry; and
polishing a semiconductor by use of the basic semiconductor polishing slurry passed through the removing module.

16. The process of claim 12,
wherein the material is formed into a self-supportable sheet.

17. The process of claim 12,
wherein the material is charged in a container provided with an inflow port and an outflow port for the polishing slurry so as to allow the polishing slurry to flow through.

18. The process of claim 12,
wherein the material is disposed in a flowable state within an area partitioned by a filter or a strainer through which the polishing slurry flows in a container provided with an inflow port and an outflow port for the semiconductor polishing slurry.

19. A material for purification of an acidic semiconductor polishing slurry used in a semiconductor polishing process, comprising:

a fibrous substrate;

an ethylenical hydroxyl group introduced onto the fibrous substrate for adsorbing at least one of a colloidal metal and a metal compound contained in the acidic semiconductor polishing slurry, the ethylenical hydroxyl group having a hydroxyl value of 40 mg KOH/g or more;

an acid-type (H type) ion-exchange functional group introduced onto the fibrous substrate for ion-exchanging a metal ion contained in the acidic semiconductor polishing slurry; and an acid-type (H type) chelate-forming functional group introduced onto the fibrous substrate for forming a metal chelate with the metal ion.

20. A material for purification of a basic semiconductor polishing slurry used in a semiconductor polishing process, comprising:

a fibrous substrate;

an ethylenical hydroxyl group introduced onto the fibrous substrate for adsorbing at least one of a colloidal metal and a metal compound contained in the basic semiconductor polishing slurry, the ethylenical hydroxyl group having a hydroxyl value of 40 mg KOH/g or more;

an alkali-metal-type ion-exchange functional group introduced onto the fibrous substrate for ion-exchanging a metal ion contained in the basic semiconductor polishing slurry, the alkali-metal-type ion-exchange functional group having alkali metal or ammonium at an ion exchange site thereof; and an alkali-metal-type chelate-forming functional group introduced onto the fibrous substrate for forming a metal chelate with the metal ion, the alkali-metal-type chelate-forming functional group having alkali metal or ammonium at an ion exchange site thereof.

* * * * *